15 MICRONS

15 MICRONS

United States Patent Office 3,737,520
Patented June 5, 1973

3,737,520
SALT-GEL PROCESS FOR THE MANUFACTURE OF FIBROUS ALKALI METAL HEXATITANATES
Howard W. Jacobson, Wilmington, Del., assignor to E. I. du Pont de Nemours and Company, Wilmington, Del.
Filed Apr. 6, 1972, Ser. No. 241,715
Int. Cl. C01g 23/00
U.S. Cl. 423—598                8 Claims

ABSTRACT OF THE DISCLOSURE

A process is provided for the preparation of fibrous alkali metal hexatitanates by homogeneously admixing an aqueous alkali metal hydroxide solution and an aqueous titanium oxychloride solution to form a salt-gel which is then calcined at 850°–1050° C. Paper pulp fibers may be included in forming the salt-gel to facilitate recovery of the calcined fibers.

BACKGROUND OF THE INVENTION

Water-insoluble, fibrous alkali metal titanates having the formula $M_2O(TiO_2)_n$ where M is an alkali metal of atomic number of at least 11, and $n$ is a number of from 4 to 8 and their preparations are disclosed in U.S. Pats. 2,833,620; 2,841,470; and 3,331,658.

Titanates prepared by the methods described in the above mentioned patents have fibrous structures in which one dimension of the crystal is longer than the other by a factor of at least 5 and up to 1000 or more. Because of their fibrous character such titanates are useful in reinforcement or insulation applications which require the inertness and physical properties of an asbestos-like material.

In the prior art processes for the preparation of alkali metal titanates considerable care is needed in the blending, usually dry blending, of the various ingredients. Unless the mixing is carried out thoroughly, this often requiring extensive periods of time for a commercial operation, a uniform product of a single crystalline phase may not result.

In many instances it has been deemed desirable to produce an alkali metal titanate species of relatively low alkali metal content, say the hexatitanate as opposed to the tetratitanate, in order to achieve superior chemical and/or thermal stability characteristics. In general, however, it has been much more difficult to directly synthesize the hexatitanates in a highly acicular form. It will be understood that the more highly acicular fibers tend to be preferred in applications such as that involved in the reinforcement of plastics.

SUMMARY OF THE INVENTION

In accordance with this invention an improved process has been found for the preparation of insoluble fibrous alkali metal hexatitanates having the general formula $M_2O(TiO_2)_6$, wherein M is as described above. The process effectively avoids the problem, also described above, that is associated with the dry blending of reactants and, at the same time, typically results in fibers of high aspect ratios. In the process of the invention a salt-gel is prepared by admixing concentrated aqueous alkali metal hydroxide solution, e.g. KOH or NaOH, and aqueous titanium oxychloride solution (e.g. as prepared from the reaction of $TiCl_4$ and ice), the mixing preferably being carried out by means of a high speed, high shear mixer. In the process, one solution is conveniently added to the other in relative amounts such that a pH of at least 9, preferably of 10–10.5, is reached, at which point a thick salt-gel is formed. The salt-gel is then cast in a suitable container and, preferably, dried. The resultant porous brick is subsequently calcined at a temperature in the range from 850° C. to 1050° C. and then leached, e.g. with water or aqueous liquids, to produce the alkali titanate fibers.

The salt-gel, it will be understood, can readily be formed either by adding the alkali metal hydroxide solution to the titanium oxychloride solution, or vice versa, or even by simultaneous blending in predetermined proportions, provided that the mixing is adequate to achieve homogeneity and the pH of at least 9, is ultimately reached. As indicated before, the pH is preferably 10–10.5. While even higher pH values may be employed, they offer no particular advantage and may be detrimental to yields. Below a pH of 9 the product may vary from a non-acicular mass to one containing, at best, a minimum of non-uniform fibers. The aqueous titanium oxychloride solution can be prepared by the reaction of titanium tetrachloride and water, preferably ice. There is, of course, an appreciable quantity of HCl in the solution but this is not detrimental since it will be neutralized with the alkali metal hydroxide to form the corresponding alkali metal chloride which, in any event, is needed for fiber growth. While other methods could be devised to form the titanium oxychloride without formation of the HCl or to even remove the HCl from the solution, such methods offer no advantage over the simple expedient of using the $TiCl_4$-ice reaction product.

The alkali metal hydroxide is preferably potassium hydroxide or sodium hydroxide or a mixture of these alkali metal hydroxides. However, other alkali metals of atomic number of at least 11 may be employed.

Wide latitude can be practiced in selecting the relative concentrations of the two aqueous solutions, with the proviso, however, that neither be so dilute as to prevent a gel from forming. Indeed it is preferred to use as little water as possible to eliminate the need for excessive drying of the salt-gel. In general it is most practical for the alkali metal hydroxide solution to contain at least 10% by weight of dissolved hydroxide and for the titanium oxychloride solution to be at least as concentrated as that obtained by admixing $TiCl_4$ and water in a 1:9 weight ratio.

The net equation describing the preparation of the alkali metal hexatitanate by the salt-gel process of the invention is:

$$6TiCl_{4(aq)} + 26MOH \rightarrow M_2Ti_6O_{13} + 24MCl + 13H_2O$$

The mixture of alkali metal hydroxide and titanium oxychloride solution is advantageously allowed to gel in a relatively shallow container, preferably the container being one provided with a non-stick lining of polytetrafluoroethylene or the like. The formation of salt-gels having a thickness of 0.1 to 2 cm. is particularly advantageous for effecting the calcination.

It will be understood that it is not essential to initially dry the salt-gel, i.e. to remove water and other gases, provided that the calcination furnace is adapted to accommodate and expel the large quantities of volatiles generated. Preferably, however, the salt-gel is first subjected to a drying temperature, e.g. of 100 to 250° C. for a brief period until all volatiles are removed.

In general a calcination period of at least ½ hour is needed in order to effect maximum conversion to the high aspect ratio alkali metal hexatitanate. The conversion is time/temperature dependent, however, such that longer times are generally needed when the temperature is in the lower part of the 850–1050° C. calcination range. Conversely, shorter periods are more useful with temperatures in the higher part of the range. In general there is no need to exceed a calcination period of 6 hours.

A modification of the invention involves addition of

2–20% by weight of paper pulp fibers to the ingredients used for preparing the salt-gel. The addition of paper pulp causes the formation of a somewhat bulkier gel and a more porous brick after drying. The paper pulp fibers burn off during calcination and leave a porous and leachable mat of titanate fibers.

DESCRIPTION OF THE DRAWINGS

The invention can be further understood by reference to the drawings in which.

EXAMPLES

To illustrate the invention more completely, the following examples are given. These are for purposes of illustration only and are not to be construed as limitations of the invention.

For a stock titanium oxychloride solution for the following examples, 820 grams of $TiCl_4$ is added to 1890 grams of ice to prepare a 30% solution. It is considered that the dissolved material in the solution is best represented as $TiOCl_2 \cdot 2HCl$.

EXAMPLE I

Fifty grams of KOH is added to 50 cc. distilled water to prepare a concentrated KOH solution. The concentrated KOH solution is placed in a Waring Blendor and the 30% aqueous stock solution is added while agitation is maintained until a pH of 10 is reached. This requires 148 grams of the stock solution.

The salt-gel thus prepared is cast into a vessel formed of high temperature-resistant glass lined with polytetrafluoroethylene. It is then dried for 4 hours at 200° C. The porous brick so formed is thereafter calcined at 1050° C. for 30 minutes.

Sixteen grams of fibrous potassium titanate is recovered by leaching the calcined brick with distilled water. This represents a 71.5% yield.

Figure 1:
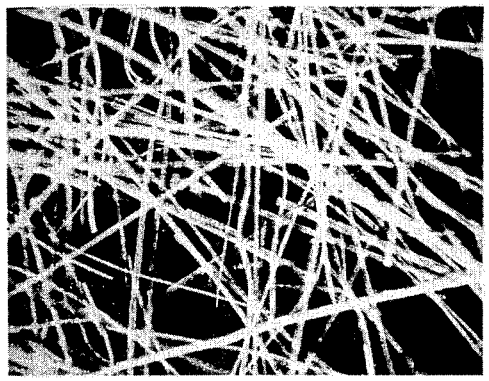
FIG. 1 is a photomicrograph at 4200× of $K_2Ti_6O_{13}$ prepared by the salt-gel process of Example I and FIG. 2 is a photomicrograph at 4200× of $K_2Ti_6O_{13}$ prepared by the salt-gel process, with the addition of paper pulp, of Example III.

X-rays show the product to be essentially in the crystalline form of $K_2Ti_6O_{13}$. The highly acicular potassium hexatitanate fibers have a surface area of 7.3 m.$^2$/g. (FIG. 1).

EXAMPLE II

Fifty grams of NaOH is added to 50 cc. distilled water to prepare the concentrated NaOH solution.

The NaOH solution is placed in a Waring Blendor and the 30% aqueous stock solution added while agitation is maintained until a pH of 10 is reached. This requires 232 grams of the stock solution.

The salt-gel thus prepared is cast, dried, calcined, and leached as in Example I.

Twenty-five grams of fibrous sodium hexatitanate is recovered, this representing a 76% yield.

EXAMPLE III

Fifty grams of KOH is added to 50 cc. distilled water to prepare a concentrated KOH solution. The concentrated KOH solution together with 10 grams wet paper pulp (20% solids) is placed in a Waring Blendor and the 30% aqueous stock solution added while agitation is maintained until a pH of 10 is reached. This requires 148 grams of the stock solution.

The salt-gel containing paper pulp is cast, dried, calcined and leached as in Example I. During calcination the paper pulp is burned off.

Seventeen grams of fibrous potassium titanate is recovered, this representing a 76% yield.

Figure 2:
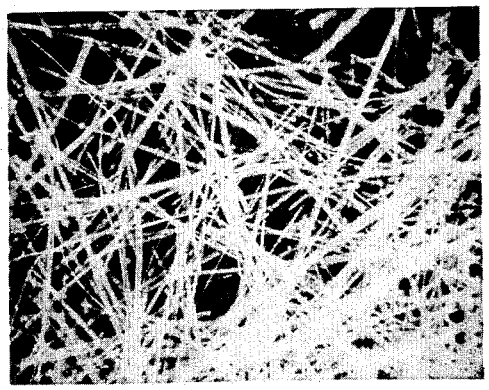

X-rays show the product to be essentially $K_2Ti_6O_{13}$. The fibrous potassium titanate has a surface area of 14 m.$^2$/gr. (FIG. 2).

What is claimed is:

1. A process for the preparation of fibrous alkali metal hexatitanates comprising homogeneously admixing an aqueous alkali metal hydroxide solution and an aqueous titanium oxychloride solution in relative amounts to produce a salt-gel of a pH of at least 9, calcining the salt-gel for at least one-half hour at a temperature of 850°–1050° C., and leaching the calcined product with an aqueous liquid to recover the hexatitanate fibers.

2. A process according to claim 1 wherein the alkali metal hydroxide is KOH.

3. A process according to claim 1 wherein the alkali metal hydroxide is NaOH.

4. A process according to claim 1 wherein the pH is 10–10.5.

5. A process according to claim 1 wherein before calcining, the salt-gel is separately dried to expel volatiles.

6. A process according to claim 1 wherein the salt-gel further contains 2–20% by weight of paper pulp fibers.

7. A process according to claim 1 wherein the alkali metal hydroxide solution contains at least 10% by weight alkali metal hydroxide and the aqueous titanium oxychloride solution is prepared by mixing $TiCl_4$ and water in the weight ratio of at least 1:9.

8. A process according to claim 7 wherein the water mixed with $TiCl_4$ is in the form of ice.

References Cited

UNITED STATES PATENTS

| | | | |
|---|---|---|---|
| 2,833,620 | 5/1958 | Gier et al. | 423—598 |
| 3,129,105 | 4/1964 | Berry et al. | 423—598 |
| 3,331,660 | 7/1967 | Berry et al. | 423—598 |
| 3,331,658 | 7/1967 | Lewis et al. | 423—598 |
| 3,380,847 | 4/1968 | Lewis et al. | 423—598 |

FOREIGN PATENTS

| | | | |
|---|---|---|---|
| 862,593 | 3/1961 | Great Britain | 423—598 |

HERBERT T. CARTER, Primary Examiner